(12) United States Patent
Shibamoto et al.

(10) Patent No.: US 11,531,008 B2
(45) Date of Patent: Dec. 20, 2022

(54) GAS SAMPLER

(71) Applicant: Shimadzu Corporation, Kyoto (JP)

(72) Inventors: Shigeaki Shibamoto, Kyoto (JP); Wenjian Lu, Kyoto (JP); Ayaka Sato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 193 days.

(21) Appl. No.: 16/919,789

(22) Filed: Jul. 2, 2020

(65) Prior Publication Data

US 2021/0088484 A1 Mar. 25, 2021

(30) Foreign Application Priority Data

Sep. 24, 2019 (JP) .............................. JP2019-173303

(51) Int. Cl.
| | |
|---|---|
| *G01N 30/38* | (2006.01) |
| *G01N 1/24* | (2006.01) |
| *G01N 30/06* | (2006.01) |
| *G01N 1/00* | (2006.01) |
| *G01N 30/02* | (2006.01) |

(52) U.S. Cl.
CPC ............... *G01N 30/38* (2013.01); *G01N 1/24* (2013.01); *G01N 30/06* (2013.01); *G01N 2001/002* (2013.01); *G01N 2030/025* (2013.01); *G01N 2030/385* (2013.01)

(58) Field of Classification Search
CPC ............... F16K 31/128; F16K 99/0015; F16K 99/0059; G01N 1/24; G01N 2001/002; G01N 2030/025; G01N 2030/385; G01N 30/06; G01N 30/20; G01N 30/38; G01N 35/1097; G06F 11/3409; G06F 11/348; G06F 12/0813; G06F 2201/81; G06F 2201/88; G06F 2201/885; G06F 2212/2542

See application file for complete search history.

(56) References Cited

U.S. PATENT DOCUMENTS

| | | | | |
|---|---|---|---|---|
| 3,174,326 | A | * | 3/1965 | Carle ................... G01N 30/466 73/23.35 |
| 4,094,187 | A | * | 6/1978 | Navarre, Jr. ....... G01N 33/0006 73/864.34 |
| 4,970,905 | A | * | 11/1990 | McClennen ............. G01N 1/14 73/864.34 |

(Continued)

FOREIGN PATENT DOCUMENTS

| | | | |
|---|---|---|---|
| CN | 102323359 A | * | 1/2012 |
| CN | 113219108 A | * | 8/2021 |
| WO | 2018/235229 A1 | | 12/2018 |

*Primary Examiner* — Nimeshkumar D Patel
*Assistant Examiner* — Gedeon M Kidanu
(74) *Attorney, Agent, or Firm* — Muir Patent Law, PLLC

(57) ABSTRACT

A gas sampler (30) is provided with a connection portion (C1) connectable to a sample tank (20), a sample loop (PL) for holding a sample gas introduced from the sample tank (20) to the connection portion (C1), pneumatic switching valves (V1 to V6) for switching a flow path connected to the sample loop (PL), a control piping (81) for transmitting a driving pressure to the switching valves (V1 to V6), a pump (31) for suctioning an inside of the sample loop (PL), and a pressure accumulation tank (80) for accumulating the pressure generated by the operation of the pump (31) as a source pressure.

8 Claims, 9 Drawing Sheets

(56) References Cited

U.S. PATENT DOCUMENTS

| | | | | |
|---|---|---|---|---|
| 5,288,310 A | * | 2/1994 | Peters | G01N 30/40 96/104 |
| 5,547,497 A | * | 8/1996 | Klemp | G01N 30/12 95/82 |
| 5,611,846 A | * | 3/1997 | Overton | G01N 30/68 95/82 |
| 5,811,059 A | * | 9/1998 | Genovese | G01N 30/10 422/89 |
| 2019/0041368 A1 | * | 2/2019 | Nakama | G01N 30/32 |

* cited by examiner

Analysis processing

GAS SAMPLER

CROSS-REFERENCE TO RELATED APPLICATIONS

This application claims priority under 35 U.S.C. § 119 to Japanese Patent Application No. 2019-173303 filed on Sep. 24, 2019, the entire disclosure of which is incorporated herein by reference in its entirety.

BACKGROUND OF THE INVENTION

Field of the Invention

The present disclosure relates to a gas sampler for supplying a sample gas to a column of a gas analyzer.

Description of the Background Art

Generally, a gas analyzer, such as, e.g., a gas chromatograph, is provided with a column for separating various components in a sample gas which is an analysis target. To the column, a sample gas is supplied by using a gas sampler. The gas sampler is provided with, for example, a sample loop of a certain volume, a flow path for introducing a sample gas to the sample loop, a flow path for introducing a carrier gas to the sample loop, a flow path for supplying the sample gas in the sample loop to the column, and a switching valve for switching a flow path connected to the sample loop. By appropriately switching the flow path connected to the sample loop by switching the switching valve, the sample gas is filled in the sample loop temporarily, and then the sample gas in the sample loop is supplied to the column by a carrier gas. As a method of filling a sample loop with a sample gas, for example, a method is adopted in which a pump to be connected to a sample loop is provided, and this pump is operated to suction the inside of the sample loop, so that the sample gas is filled in the sample loop.

WO-A-2018/235229 discloses a technique in which a pneumatic valve that is opened and closed by a pressure of a control fluid (hereinafter also referred to as "driving pressure") is used as a switching valve for switching a flow path in a gas sampler.

SUMMARY OF THE INVENTION

A carrier gas may pass through a switching valve for switching a flow path in a gas sampler. Therefore, the carrier gas pressure may act on the switching valve. In cases where the switching valve is a pneumatic valve, in order to switch the state of the switching valve in a state in which the carrier gas pressure is acting on the switching valve, it is required to supply a driving pressure greater than a carrier gas pressure to the switching valve. For this reason, conventionally, a dedicated pressure controller for generating a driving pressure of a switching valve is provided separately from the pressure controller for generating a carrier gas pressure, and the entire device is likely to become large and complicated because of the reasons.

The present disclosure has been made to solve the above-mentioned problems, and an object of the present disclosure is to enable generation of a driving pressure of a switching valve in a gas sampler including a pneumatic switching valve without providing a dedicated pressure controller.

A gas sampler according to an aspect of the present disclosure is directed to a gas sampler for supplying a sample gas to a column of a gas analyzer. In some examples the gas sampler includes: a connection portion connectable to a sample tank filled with the sample gas; a sample holding portion arranged to accommodate the sample gas to be introduced into the connection portion from the sample tank; a plurality of pneumatic switching valves configured to configure different flow paths within the gas sampler respectively corresponding to different switching configurations of the pneumatic switching valves, at least some of the flow paths being connected to the sample holding portion; control piping configured to transmit driving pressure to the pneumatic switching valves to control a connection state of each pneumatic switching valve; a pump configured to apply suction inside the sample holding portion; and a tank configured to accumulate pressure generated by an operation of the pump for a source pressure from which the driving pressure is derived.

The gas sampler may be provided with a tank for accumulating pressure generated by operating a pump for suctioning the inside of the sample holding portion as a source pressure of a driving pressure. Therefore, the source pressure of the driving pressure can be accumulated in the tank by operating the pump before controlling the switching valve. Therefore, the switching valve can be controlled by the driving pressure accumulated in the tank. As a result, the driving pressure of the switching valve can be generated without providing a dedicated pressure controller for generating a source pressure of a driving pressure, thereby suppressing the gas analyzer from becoming large and complicated.

A gas sampler according to another aspect of the present disclosure is directed to a gas sampler for supplying a sample gas to a column of a gas analyzer. The gas sampler may include: a connection portion connectable to a sample tank filled with the sample gas; a sample holding portion arranged to accommodate the sample gas to be introduced into the connection portion from the sample tank; a plurality of pneumatic switching valves configured to configure different flow paths within the gas sampler respectively corresponding to different switching configurations of the pneumatic switching valves, at least some of the flow paths being connected to the sample holding portion; control piping configured to transmit driving pressure to the pneumatic switching valves to control a connection state of each pneumatic switching valve; a pump configured to apply suction inside the sample holding portion; and supply piping arranged between the pump and the control piping to supply a pressure generated by an operation of the pump to the control piping as a source pressure of the driving pressure.

The gas sampler may be provided with the supply piping for supplying a pressure generated by the operation of the pump for suctioning the inside of the sample holding portion to the control piping of the switching valve. Therefore, the driving pressure of the switching valve can be generated by operating the pump. As a result, the driving pressure of the switching valve can be generated without providing a dedicated pressure controller for generating a source pressure of a driving pressure, thereby suppressing the gas analyzer from becoming large and complicated.

The above-described objects and other objects, features, aspects, and advantages of the present invention will become apparent from the following detailed descriptions of the invention that can be understood with reference to the attached drawings.

DESCRIPTION OF THE PREFERRED EMBODIMENT

Figure 1:
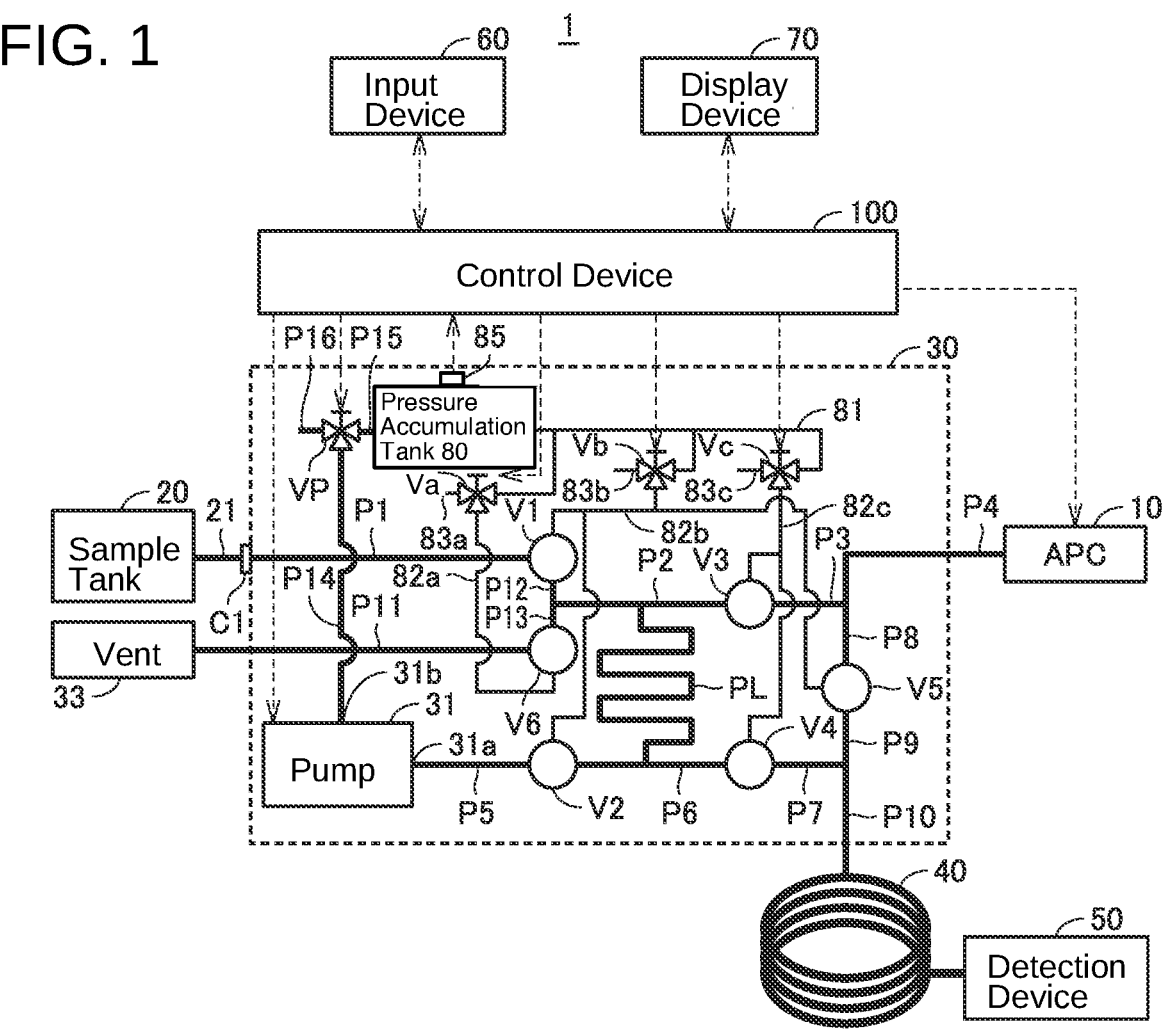
FIG. 1 is a diagram schematically showing an example of a configuration of a gas chromatograph.

Hereinafter, an embodiment of the present disclosure will be described in detail with reference to the attached drawings. In the drawings, the same or corresponding portions are denoted by the same reference numerals, and the description thereof will not be repeated.

[Device Configuration]

FIG. 1 is a diagram schematically showing an example of a configuration of a gas chromatograph (gas analyzer) 1 including a gas sampler 30 according to this embodiment.

The gas chromatograph 1 is provided with an electronic automatic pressure controller (Automatic Pressure Controller, hereinafter also referred to as "APC") 10, a sample tank 20, a gas sampler 30, a vent 33, a column 40, a detection device 50, a display device 70, an input device 60, and a control device 100. The vent 33 communicates with the outside of the gas sampler 30.

The APC 10 adjusts a mobile phase called a carrier gas to a pressure corresponding to a command from the control device 100 and outputs the mobile phase to the piping P4. The carrier gas output from the APC 10 to the piping P4 is supplied to the column 40 through the inside of the gas sampler 30. Note that as a carrier gas, for example, a helium gas is used.

The sample tank 20 is a tank for accumulating a sample gas that is a target sample. The sample tank 20 is connected to the connection portion Cl of the gas sampler 30 via the introduction piping 21. A user can change a sample gas to be analyzed by the gas chromatograph 1 by exchanging the sample tank 20 and the introduction piping 21 connected to the connection portion Cl of the gas sampler 30.

The gas sampler 30 is a device for supplying a sample gas to the column 40 by a certain amount. The gas sampler 30 is provided with the connection portion Cl, a sample loop PL of a constant volume, pipings P1 to P13, switching valves V1 to V6, and the pump 31. Note that the sample loop PL is an example of a sample holding portion.

The connection portion Cl is configured to be connectable to an introduction piping 21 connected to the sample tank 20. The piping P1 communicates between the connection portion Cl and the switching valve V1. The piping P2 communicates between the piping P12 and the switching valve V3. The piping P3 communicates between the switching valve V3 and the piping P4. The piping P5 communicates between the suction port 31a of the pump 31 and the switching valve V2. The piping P6 communicates between the switching valve V2 and the switching valve V4. The piping P7 communicates between the switching valve V4 and the piping P10. The piping P8 communicates between the piping P4 and the switching valve V5. The piping P9 communicates between the switching valve V5 and the piping P10. The piping P10 communicates between the piping P9 and the column 40. The piping P11 communicates between the vent 33 and the switching valve V6. The piping P12 communicates between the switching valve V1 and the piping P2. The piping P13 communicates the piping P2 and the switching valve V6. The piping P4 is branched into the piping P3 and the piping P8 in the gas sampler 30. The piping P2 is branched into the piping P12 and the piping P13. The piping P7 and the piping P9 merge into the piping P10 within the gas sampler 30.

The sample loop PL is connected between the piping P2 and the piping P6. The sample loop PL has a function of temporarily holding the sample gas introduced from the sample tank 20 to be supplied to the column 40.

The suction port 31a of the pump 31 is connected to the sample loop PL via the piping P5, the switching valve V2, and the piping P6. The pump 31 is a suction pump for filling a sample loop PL with a sample gas by suctioning inside the sample loop PL.

The switching valves V1 to V6 each are a pneumatic valve which is opened and closed by the pressure of the control air (hereinafter also referred to as "driving pressure"). The gas sampler 30 is equipped with pipings P14 and P15, an exhaust pipe P16, a pressure accumulation valve VP, a pressure accumulation tank 80, control pipings 81, 82a to 82c, exhaust pipes 83a to 83c, and control valves Va to Vc as components for supplying a driving pressure to the switching valves V1 to V6. Note that in the following description, the pressure accumulation tank 80, the control piping 81, 82a to 82c, the exhaust pipes 83a to 83c, and a flow path including the control valves Va to Vc are also referred to as a "pneumatic flow path system".

The switching valves V1 to V6 each are a so-called normally open-type valve which is in an open state in an initial state in which no driving pressure is supplied and becomes a closed state when a driving pressure is supplied.

Each of the switching valves V1, V2, and V5 is communicated with the control valve Vb via the control piping 82b, and is opened and closed according to the presence or absence of the driving pressure from the control valve Vb. The switching valves V3 and V4 are communicated with the control valve Vc through the control piping 82c, and are opened and closed according to the presence or absence of the driving pressure from the control valve Vc. The switching valve V6 is communicated with the control valve Va through the control piping 82a, and is opened and closed according to the presence or absence of the driving pressure from the control valve Va.

The control piping 81 is communicated with the control pipings 82a to 82c via the control valves Va to Vc. The control valves Va to Vc each are a three-way solenoid valve controlled by the command signal from the control device 100.

The control valve Vb is connected to the control piping 81, the control piping 82b, and the exhaust pipe 83b, and is controlled to be either a supply state in which the exhaust pipe 83b is cut off and the control piping 81 and the control piping 82b are communicated with each other or a cut-off state in which the control piping 82b and the exhaust pipe 83b are communicated with each other and the control piping 81 is cut off. When the control valve Vb is controlled to be in the supply state, since the driving pressure is supplied from the control piping 81 to the switching valves V1, V2, and V5 via the control valve Vb, the switching valves V1, V2, and V5 become a closed state. As a result, the piping P1 and the piping P12 are cut off, the piping P5 and the piping P6 are cut off, and the piping P8 and the piping P9 are cut off. On the other hand, when the control valve Vb is controlled to be in the cut-off state, the driving pressure supplied to the switching valves V1, V2, and V5 is discharged to the exhaust pipe 83b, so that the switching valve V1, V2, and V5 become an open state. Thereby, the piping P1 and piping P12 are communicated with each other, the piping P5 and piping P6 are communicated with each other, and the piping P8 and the piping P9 are communicated with each other.

The control valve Vc is connected to the control piping 81, the control piping 82c, and the exhaust pipe 83c, and is controlled to either a supply state in which the control piping 81 and the control piping 82c are communicated with each other and the exhaust pipe 83c is cut off or a cut-off state in which the piping 82c and the exhaust pipe 83c are communicated with each other and the control piping 81 is cut off. When the control valve Vc is controlled to be in the supply state, since the driving pressure is supplied from the control piping 81 to the switching valves V3 and V4 via the control valve Vc, the switching valves V3 and V4 become the closed state. As a result, the piping P2 and the piping P3 are cut off, and the piping P6 and the piping P7 are cut off. On the other hand, when the control valve Vc is controlled to be in the cut-off state, the driving pressure supplied to the switching valves V3 and V4 is discharged to the exhaust pipe 83c, and the switching valves V3 and V4 become the open state. As a result, the piping P2 and the piping P3 are communicated with each other, and the piping P6 and the piping P7 are communicated with each other.

The control valve Va is connected to the control piping 81, the control piping 82a, and the exhaust pipe 83a, and is controlled to either a supply state in which the control piping 81 and the control piping 82a are communicated with each other and the exhaust pipe 83a is cut off or a cut-off state in which the control piping 82a and the exhaust pipe 83a are communicated with each other and the control piping 81 is cut off. When the control valve Va is controlled to be in the supply state, since the driving pressure is supplied from the control piping 81 to the switching valve V6 via the control valve Va, the switching valve V6 becomes a closed state. As a result, the piping P11 (vent 33) and the piping P13 are cut off. On the other hand, when the control valve Va is controlled to be in the cut-off state, since the driving pressure supplied to the switching valve V6 is discharged to the exhaust pipe 83a, the switching valve V6 becomes the open state. As a result, the piping P11 (vent 33) and the piping P13 are communicated with each other.

The pressure accumulation tank 80 is a tank connected to the control piping 81 and to accumulate a pressure (hereinafter referred to as a "source pressure of the driving pressure) which becomes a source for generating the driving pressure of the switching valves V1 to V6 together with the control piping 81. The pressure accumulation tank 80 is provided with a pressure sensor 85. The pressure sensor 85 detects the pressure in the pressure accumulation tank 80 and outputs the detected pressure to the control device 100.

The piping P14 communicates between the discharge port 31b of the pump 31 and the pressure accumulation valve VP. The piping P15 communicates between the pressure accumulation tank 80 and the pressure accumulation valve VP.

The pressure accumulation valve VP is connected to the piping P14, the piping P15, and the exhaust pipe P16. The pressure accumulation valve VP is controlled to either a supply state in which the piping P14 and the piping P15 are communicated with each other and the exhaust pipe P16 is cut off or an exhaust state in which the piping P14 and the exhaust pipe P16 are communicated with each other and the piping P15 is cut off. When the pressure accumulation valve VP is controlled to be in the supply state, the discharge pressure of the pump 31 is supplied to the pressure accumulation tank 80 via the pressure accumulation valve VP. On the other hand, when the pressure accumulation valve VP is controlled to be the exhaust state, the discharge pressure of pump 31 is discharged to the exhaust pipe P16 through the pressure accumulation valve VP.

By appropriately switching the connection destination of the sample loop PL by the control of the switching valves V1 to V6, the sample gas from the sample tank 20 is temporarily accumulated in the sample loop PL, and thereafter the sample gas in the sample loop PL is supplied to the column 40. The supply method of the sample gas to the column 40 in the gas sampler 30 will be described in detail later.

The column 40 separates various components in the sample gas supplied from the gas sampler 30. Specifically, while the sample gas supplied to the column 40 passes through the column 40 along with the flow of carrier gas output from the APC 10, various components contained in the sample gas are separated in the temporal direction. The components separated in the column 40 are introduced into the detection device 50 from the column 40.

The detection device 50 detects the components introduced from the column 40. As the detection device 50, for example, an absorption photometric detector (PDA (Photo Diode Array) detector), a fluorescent detector, a differential refractive index detector, a conductivity detector, a mass spectrometer, or the like can be used. The data indicating the detection results by the detection device 50 is stored in a memory in the control device 100, and is displayed on the display device 70 by a request from a user.

The input device 60 is a pointing device, such as, e.g., a keyboard and a mouse, that accepts commands from a user. The display device 70 is composed of, for example, a liquid crystal (LCD) panel and displays data for a user. In cases where a touch panel is used as a user interface, the input device 60 and the display device 70 are integrally formed.

The control device 100 includes a CPU (Central Processing Unit), a memory, an interface, etc., which are not shown. The control device 100 generally controls the entire gas chromatograph 1 including the pump 31, the APC 10, and the switching valves V1 to V6 (control valves Va to Vc). The control device 100 is wired or wirelessly connected to the input device 60 and the display device 70, which are user interfaces.

When supplying a sample gas from the gas sampler 30 to the column 40, the control device 100 controls the pump 31 and the switching valves V1 to V6 so that the sample gas supplied from the sample tank 20 is temporarily held in the sample loop PL and then the sample gas held in the sample loop PL is supplied to the column 40.

The carrier gas from the APC 10 may pass through the switching valves V1 to V6. Therefore, the carrier gas pressure may act on the switching valves V1 to V6. Therefore, in order to switch the pneumatic switching valve V1 to V6 from the open state to the closed state, a driving pressure greater than the carrier gas pressure needs to be supplied to the switching valve V1 to V6. However, if a dedicated APC for generating a driving pressure greater than the carrier gas pressure is provided separately from the APC 10 for generating the carrier gas pressure, the entire gas chromatograph 1 becomes large and complicated due to the influence.

Therefore, in the gas sampler 30 according to this embodiment, the pressure accumulation tank 80 is provided between the discharge port 31b of the pump 31 for filling a sample gas and the control piping 81 for supplying the driving pressure. Therefore, by operating the pump 31, the discharge pressure of the pump 31 can be accumulated in the pressure accumulation tank 80 as a source pressure of the driving pressure. As a result, a dedicated APC for generating a source pressure of the driving pressure becomes unnecessary, and an increase in size and complexity of the gas chromatograph 1 are suppressed.

Note that the pump 31 of this embodiment is configured to be adjustable so that the discharge pressure of the pump 31 is greater than the carrier gas pressure by a predetermined value. Therefore, in this embodiment, the driving pressure supplied from the control piping 81 to the respective switching valves V1 to V6 can be made greater than the carrier gas pressure acting on the respective switching valves V1 to V6 by a predetermined value. This allows the switching valves V1 to V6 to be switched appropriately from the open state to the closed state.

It should be noted that the terms "connection portion Cl", "sample loop PL", "control piping 81", "switching valves V1 to V6", "pump 31", "pressure accumulation tank 80" and "vent 33" in this embodiment correspond to "connection portion", "sample holding portion", "control piping", "switching valve", "pump", "tank" and "vent" in the present disclosures, respectively. Also note that, the terms "switching valve V6" and "pressure accumulation valve VP" in this embodiment correspond to "vent valve" and "pressure accumulation valve" in the present disclosure, respectively. Also note that the term "piping P14" in this embodiment corresponds to "supply piping" in the present disclosure.

[Supply Operation of Sample Gas]

In the control device 100 of this embodiment, by executing pressure accumulation processing, sample filling processing, sample supply processing, analysis processing described below in this order, the sample gas is temporarily filled in the sample loop PL and then the sample gas filled in the sample loop PL is supplied to the column 40 to be analyzed.

First, the pressure accumulation processing will be described. The pressure accumulation processing is processing in which the discharge pressure of the pump 31 is accumulated in the pressure accumulation tank 80 as a source pressure of the driving pressure of the switching valves V1 to V6 by operating the pump 31. In this embodiment, an example will be described in which the pressure accumulation processing is executed at the time of activating the gas chromatograph 1 (before driving the switching valves V1 to V6).

Figure 2:
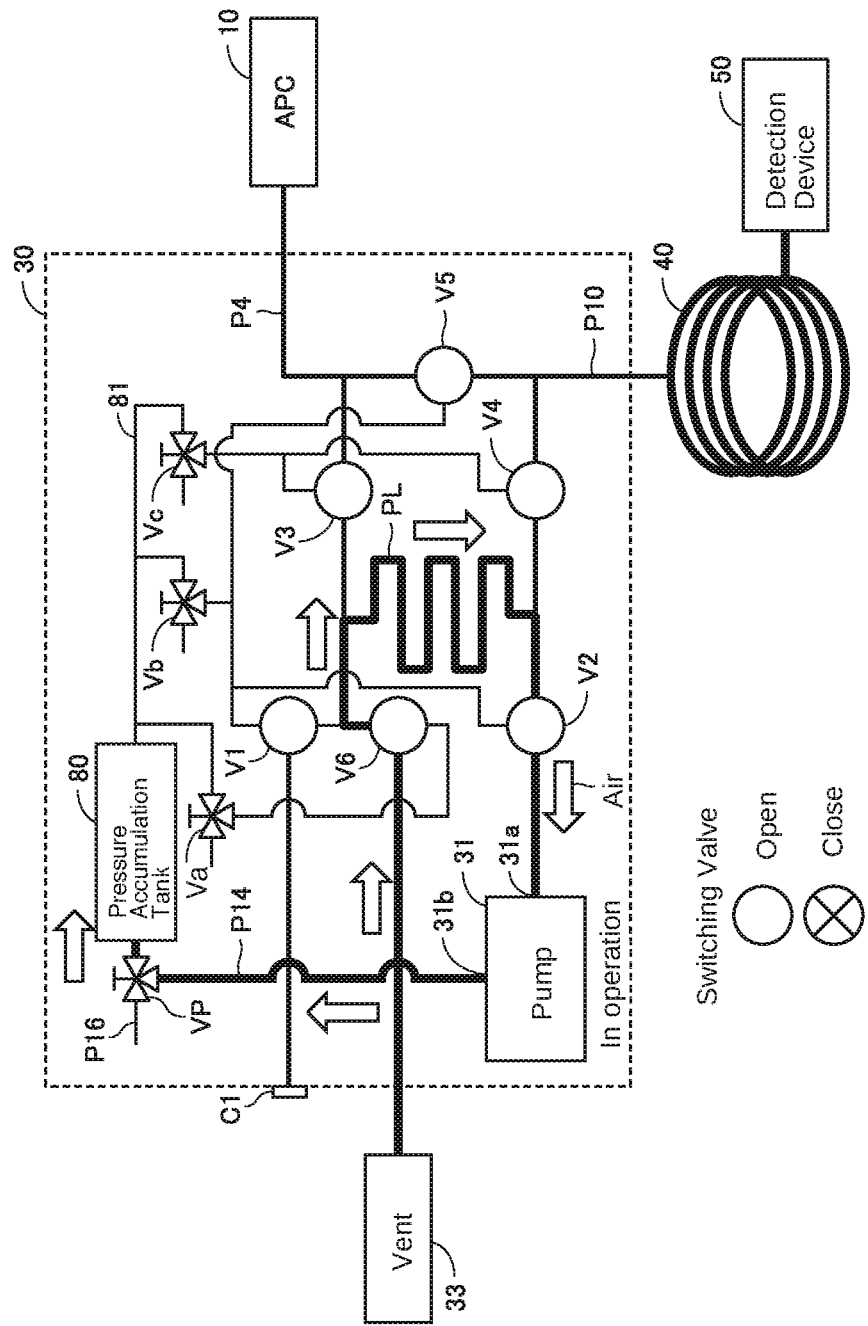
FIG. 2 is a diagram showing a state of a gas sampler during pressure accumulation processing.

FIG. 2 is a diagram showing the state of the gas sampler 30 during the pressure accumulation processing. Since the switching valves V1 to V6 are normally open valves, when the gas chromatograph 1 is activated, the switching valves V1 to V6 are all in the open state.

In this state, the control device 100 makes the control valves Va to Vc in the exhaust state to cut off the control piping 81 from each of the switching valves V1 to V6, makes the pressure accumulation valve VP in the supply state to communicate the discharge port 31b of the pump 31 with the pressure accumulation tank 80, and activates the pump 31. With this, as indicated by the white hollow arrows, the air is suctioned from the vent 33 to the pump 31 through the switching valve V6, the sample loop PL, and the switching valve V2. The air suctioned into the pump 31 is pressurized in the pump 31 and then supplied from the discharge port 31b of the pump 31 to the pressure accumulation tank 80 via the piping P14 and the pressure accumulation valve VP. As a result, the discharge pressure of the pump 31 is accumulated in the pressure accumulation tank 80. At this time, the control device 100 adjusts the output of the pump 31 so that the discharge pressure of the pump 31 becomes greater than the carrier gas pressure by a predetermined value. Therefore, the pressure (source pressure of the driving pressure) accumulated in the pressure accumulation tank 80 becomes greater than the carrier gas pressure by the predetermined value.

Note that as shown in FIG. 2, the pressure accumulation processing is executed in a state in which a sample tank 20 has not yet been connected to the connection portion Cl. Therefore, even if the switching valve V1 is in the open state during the pressure accumulation processing, a sample gas is not supplied into the pressure accumulation tank 80. This prevents a sample gas from entering into the pneumatic flow path system (pressure accumulation tank 80, control piping 81, control valves Va to Vc or the like), so that the pneumatic flow path system is prevented from being corroded by a sample gas.

Next, the sample filling processing will be described. A sample filling processing is processing in which the pump 31 is operated in a state in which a sample tank 20 is connected to the connection portion Cl to fill the sample loop PL with the sample gas from the sample tank 20.

Figure 3:
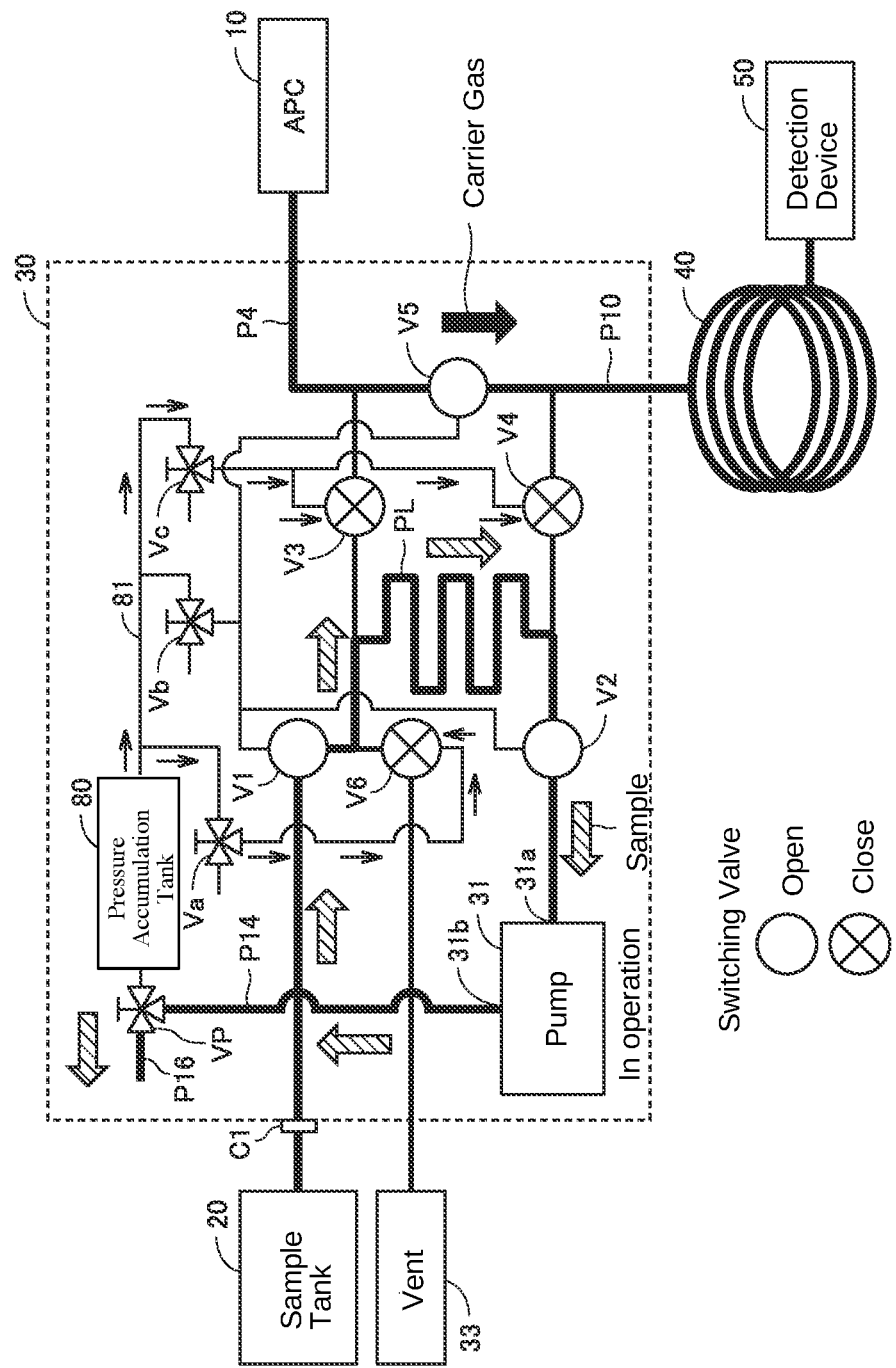
FIG. 3 is a diagram showing a state of a gas sampler during sample filling processing.

FIG. 3 is a diagram showing the state of the gas sampler 30 during the sample filling processing. During the sample filling processing, the control device 100 makes the state of the control valves Va and Vc in the supply state, makes the control valve Vb in the cut-off state, and makes the pressure accumulation valve VP in the exhaust state.

By making the control valves Va and Vc in the supply state, the driving pressure is supplied from the control piping 81 to the switching valves V3, V4, and V6 via the control valves Va and Vc, as indicated by the thin arrows. With this, the switching valves V3, V4, and V6 become in the closed state. On the other hand, since the control valve Vb is in the cut-off state, no driving pressure is supplied to the switching valves V1 and V2, and therefore the switching valves V1 and V2 remain in the open state. Further, by making the pressure accumulation valve VP in the exhaust state, the pressure accumulation tank 80 is cut off from the piping P14 and the exhaust pipe P16, and the piping P14 is communicated with the exhaust pipe P16.

In this state, the control device 100 activates the pump 31. As a result, as indicated by the hatched arrows, the sample gas from the sample tank 20 is supplied to the sample loop PL. At this time, the sample gas in the sample loop PL can also be suctioned into the pump 31 and discharged to the piping P14, but since the pressure accumulation valve VP is in the exhaust state and the piping P14 is communicated with the exhaust pipe P16, the sample gas will not be supplied to the pressure accumulation tank 80 and discharged to the exhaust pipe P16. Therefore, the deterioration of the tank is suppressed. Also in the sample filling processing, the sample gas is prevented from entering into the pneumatic flow path system.

Since it is desirable to constantly fill the column 40 with the carrier gas, the APC 10 is operated after the sample filling processing. Thus, as shown in the black solid arrow, the carrier gas from the APC 10 is supplied to the column 40 via the switching valve V5.

Next, the sample supply processing will be described. The sample supply processing is processing for supplying the sample gas filled in the sample loop PL by the sample filling processing to the column 40 by using the carrier gas.

Figure 4:
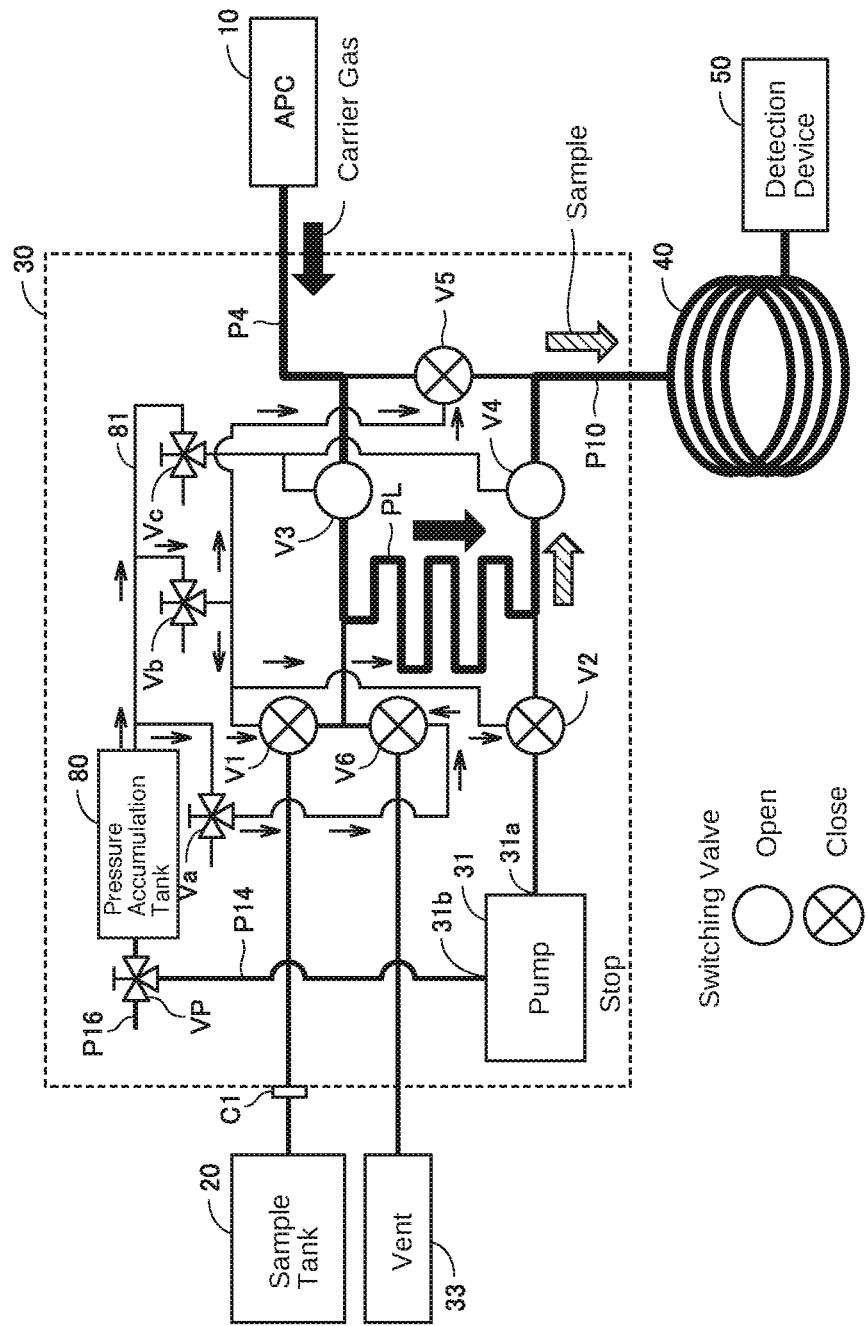
FIG. 4 is a diagram showing a state of a gas sampler during sample supply processing.

FIG. 4 is a diagram showing a state of the gas sampler 30 during the sample supply processing. During the sample supply processing, the control device 100 makes the state of the control valves Va and Vb in the supply state, makes the control valve Vc in the cut-off state, and makes the pressure accumulation valve VP in the exhaust state while stopping the pump 31.

By making the control valves Va and Vb in the supply state, the driving pressure is supplied from the control piping 81 to the switching valves V1, V2, V5, and V6 via the control valves Va and Vb, as indicated by the thin arrows. As a result, the switching valves V1, V2, V5, and V6 become in the closed state. On the other hand, since the control valve Vc is in the cut-off state, no driving pressure is supplied to the switching valves V3 and V4, and the switching valve V3 and V4 become in the open state. Thereby, as shown in the black solid arrows, the carrier gas from the APC 10 is supplied to the sample loop PL via the piping P4 and the switching valve V3, and the sample gas filled in the sample loop PL is pushed out by the carrier gas and supplied to the column 40 via the switching valve V4 and the piping P10.

Next, the analysis processing will be described. The analysis processing is processing in which the sample gas supplied to the column 40 by the sample supply processing is analyzed by the detection device 50.

Figure 5:
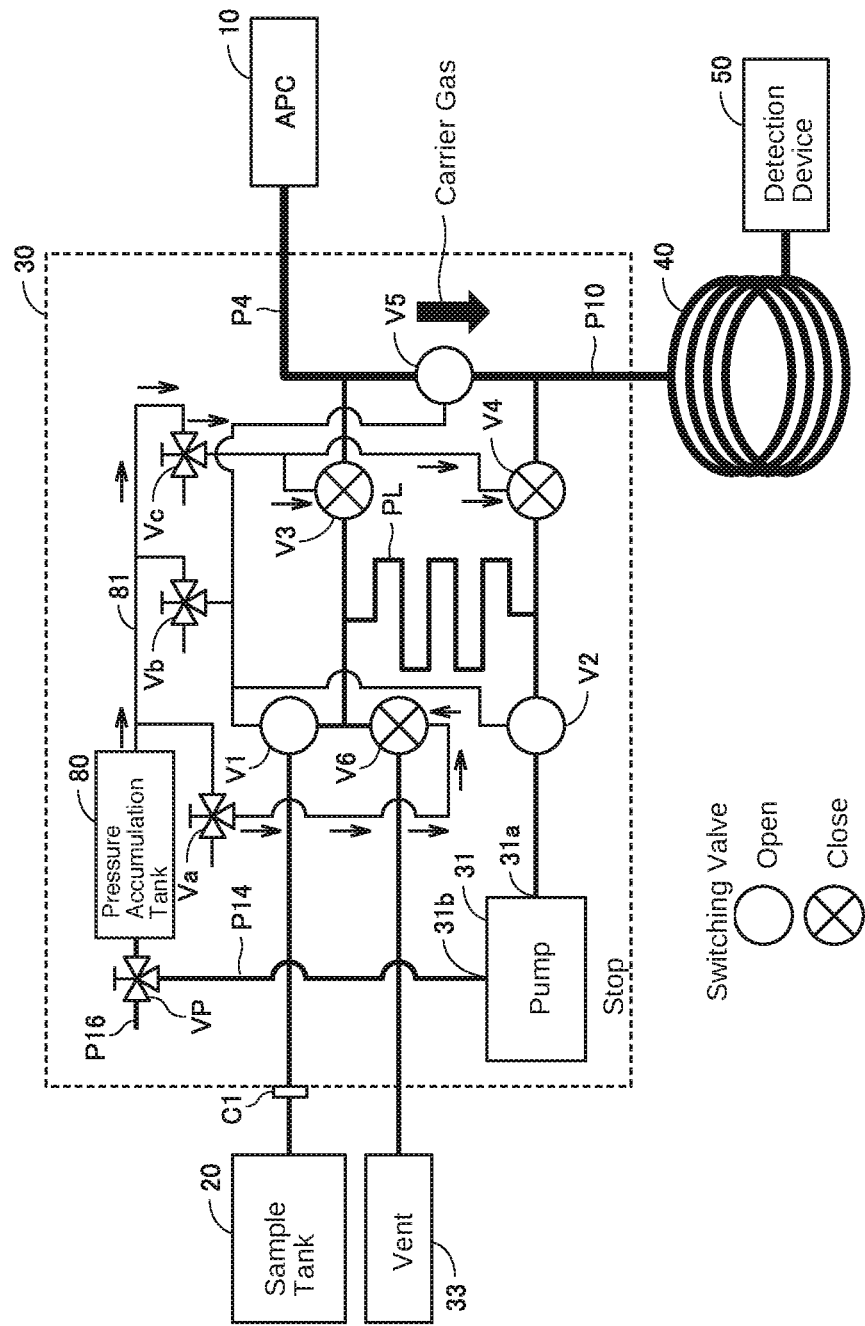
FIG. 5 is a diagram showing a state of a gas sampler during analysis processing.

FIG. 5 is a diagram showing the state of the gas sampler 30 during the analysis processing. During the analysis processing, the control device 100 makes the control valves Va and Vc in the supply state, makes the control valve Vb in the cut-off state, and makes the pressure accumulation valve VP in the exhaust state while stopping the pump 31. With this, as indicated by the thin arrows, the driving pressure is supplied from the control piping 81 to the switching valves V3, V4, and V6 via the control valves Va and the Vc. Therefore, the switching valves V3, V4, and V6 become in the closed state. On the other hand, since the control valve Vb is in the cut-off state, the switching valves V1, V2, and V5 become in the open state. Therefore, as shown in the black solid arrows, the carrier gas from the APC 10 is supplied to the column 40 via the switching valve V5.

During the execution of the sample filling processing, the sample supply processing, and the analysis processing, the pressure accumulation valve VP is made in the exhaust state, so that the pressure accumulation tank 80 is cut out from the piping P14 and the exhaust pipe P16. Therefore, the pressure in the pressure accumulation tank 80 does not leak to the piping P14 and the exhaust pipe P16, but is gradually reduced by supplying the driving pressure to each of the switching valves V1 to V6 in each processing. Thus, the pressure to be accumulated in the pressure accumulation tank 80 by the pressure accumulation processing is set considering the pressure drop in the sample filling processing, the sample supply processing, and the analysis processing. That is, in the pressure accumulation processing, the pressure to be accumulated in the pressure accumulation tank 80 is adjusted to be a value greater than the carrier gas pressure by a "predetermined value", and this "predetermined value" is set to a value greater than the sum of the pressure reduction amounts in the sample filling processing, the sample supply processing, and the analysis processing. As a result, even if the pressure accumulated in the pressure accumulation tank 80 is reduced by the sample filling processing, the sample supply processing, and the analysis processing, the driving pressure can be maintained to be higher than the carrier gas pressure in the respective processing. Further, the "predetermined value" may be set by considering the pressure drop in the flow path from the control piping 81 to each switching valves V1 to V6, in addition to the pressure drop in each processing.

Figure 6:
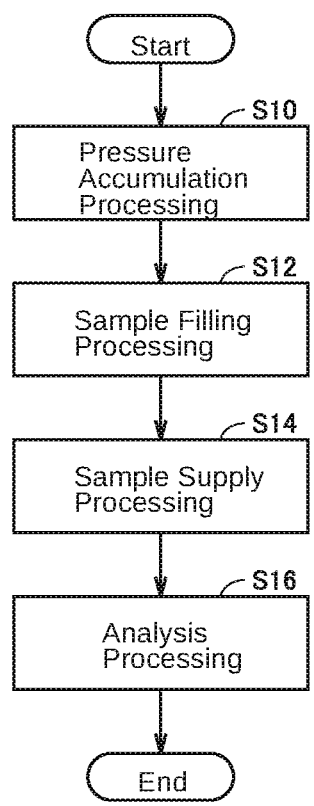
FIG. 6 is a (first) flowchart illustrating procedures of processing executed by a control device.

FIG. 6 is a flowchart illustrating a procedure of processing to be executed when the control device 100 supplies the sample gas from the gas sampler 30 to the column 40. This flowchart starts when the gas chromatograph 1 is activated. When the gas chromatograph 1 is activated, the sample tank 20 has not yet been connected to the connection portion Cl.

The control device 100 executes the pressure accumulation processing described above (Step S10). Specifically, as shown in FIG. 2 described above, the control device 100 makes the control valves Va to Vc in the cut-off state to cut off the control piping 81 from each of the switching valves V1 to V6, and makes the pressure accumulation valves VP in the supply state to communicate the discharge port 31b of the pump 31 with the pressure accumulation tank 80, and activates the pump 31. As a result, the discharge pressure of the pump 31 is accumulated in the pressure accumulation tank 80 as a source pressure of the driving pressure. The pressure accumulated in the pressure accumulation tank 80 by this pressure accumulation processing is used as a source pressure of the driving pressure of the switching valves V1 to V6 in the subsequent processing. This eliminates the need for a dedicated pressure controller for generating a source pressure of a driving pressure, and suppresses the increase in size of the gas chromatograph 1.

In the pressure accumulation processing, the control device 100 regulates the pressure of the pump 31 so that the pressure in the pressure accumulation tank 80 is greater than the carrier gas pressure by the predetermined value, as described above. The control for adjusting the output of the pump 31 may be a feedforward control in which the pump 31 is operated under a predetermined condition, or may be a feedback control in which the pump 31 is operated so that the detected value of the pressure sensor 85 becomes larger than the carrier gas pressure by a value predetermined value.

After executing the pressure accumulation processing, the control device 100 executes the sample filling processing described above (Step S12). Specifically, as shown in FIG. 3, the control device 100 makes the control valves Va and Vc in the supply state to set the switching valves V3, V4, and V6 in the closed state, makes the control valve Vb in the cut-off state to set the switching valves V1, V2, and V5 in the open state, makes the pressure accumulation valve VP in the exhaust state, and operates the pump 31. With this, the sample gas from the sample tank 20 is filled in the sample loop PL, and the sample gas is prevented from entering into the pneumatic flow path system.

After executing the sample filling processing, the control device 100 executes the sample supply processing as described above (Step S14). More specifically, as shown in FIG. 4 described above, the control device 100 makes the control valves Va and Vb in the supply state to set the switching valves V1, V2, V5, and V6 in the closed state, makes the control valve Vc in the cut-off state to set the switching valves V3 and V4 in the open state, and makes the pressure accumulation valve VP in the exhaust state while stopping the pump 31. With this, the sample gas filled in the sample loop PL is supplied to the column 40 by the carrier gas.

After executing the sample supply processing, the control device 100 executes the analysis processing as described above (Step S16). More specifically, as shown in FIG. 5 described above, the control device 100 makes the control valve Va and Vc in the supply state to set the switching valves V3, V4, and V6 in the closed state, makes the control valve Vb in the cut-off state to set the switching valves V1, V2, and V5 in the open state, and makes the pressure accumulation valve VP in the exhaust state while stopping the pump 31. Thereby, the sample gas filled in the sample loop PL is supplied from the column 40 to the detection device 50 by the carrier gas and analyzed by the detection device 50.

It should be noted that the terms "control device 100", "pressure accumulation processing", "sample filling processing", and "sample supply processing" in this embodiment correspond to "control device", "pressure accumulation processing", "introduction processing" and "supply processing" in the present disclosures, respectively.

As described above, in the gas sampler 30 according to this embodiment, the pressure accumulation tank 80 is provided between the discharge port 31b of the pump 31 for filling a sample gas and the control piping 81 for supplying a driving pressure. Therefore, by operating the pump 31, the discharge pressure of the pump 31 can be accumulated in the pressure accumulation tank 80 as a source pressure of a driving pressure. As a result, a dedicated pressure controller for generating a source pressure of a driving pressure is not required, which suppresses an increase in size of the gas chromatograph 1.

[Modification]

(First Modification)

In the above-described embodiment, the pressure accumulation processing is always executed at the time of activating the gas chromatograph 1 (see FIG. 6).

However, the pressure accumulation processing may be executed when the pressure in the pressure accumulation tank 80 (hereinafter also referred to as "tank pressure") is lower than a threshold at the time of activating the gas chromatograph 1. If it is not the case, the pressure accumulation processing may be omitted.

Figure 7:
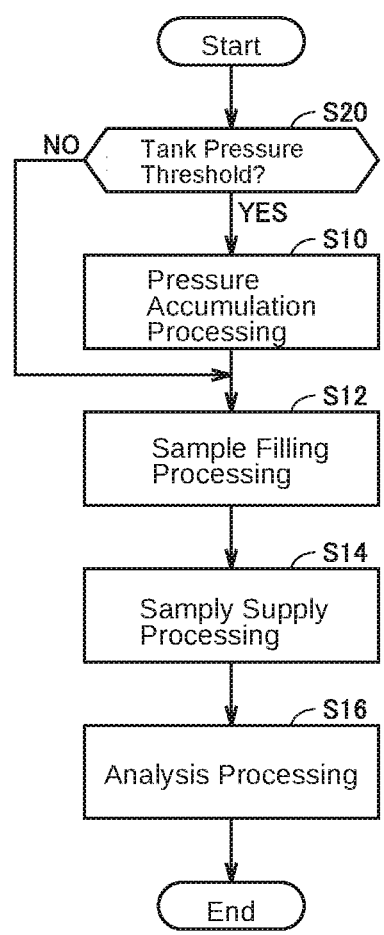
FIG. 7 is a (second) flowchart illustrating procedures of processing executed by a control device.

FIG. 7 is a flowchart illustrating a procedure of the processing in which the control device 100 according to the first modification executes at the time of supplying a sample gas from the gas sampler 30 to the column 40. The flowchart shown in FIG. 7 is obtained by adding Step S20 to the above-mentioned flowchart shown in FIG. 6 before Step S10. The rest of Steps (Steps having the same numbers as those of Steps shown in FIG. 6) have been described above, and therefore the detailed descriptions thereof will not be repeated here.

In Step S20, the control device 100 determines whether or not the tank pressure detected by the pressure sensor 85 is lower than a threshold (Step S20). Note that the "threshold" is set to a value greater than, for example, the carrier gas pressure by a predetermined value.

When the tank pressure is lower than the threshold (YES in Step S20), the control device 100 executes pressure accumulation processing (Step S10). After executing the pressure accumulation processing, the control device 100 sequentially executes the sample filling processing and subsequent processing (Step S12 to Step S16).

On the other hand, when the tank pressure is higher than the threshold (NO in Step S20), the control device 100 omits the pressure accumulation processing and sequentially executes the sample filling processing and subsequent processing (Step S12 to Step S16).

As described above, when the tank pressure is higher than the threshold at the time of activating the gas chromatograph 1, the pressure accumulation processing may be omitted. As a result, unnecessary pressure accumulation processing is suppressed, so that it is possible to shorten the time required for analyzing a sample gas.

(Second Modification)

In the gas sampler 30 according to the above-described embodiments, an example is shown in which the pump 31 is configured to be communicable to the vent 33 via the sample loop PL (see FIG. 1, etc.). However, the pump 31 may be configured to be communicable to the vent 33 without by way of the sample loop PL.

Figure 8:
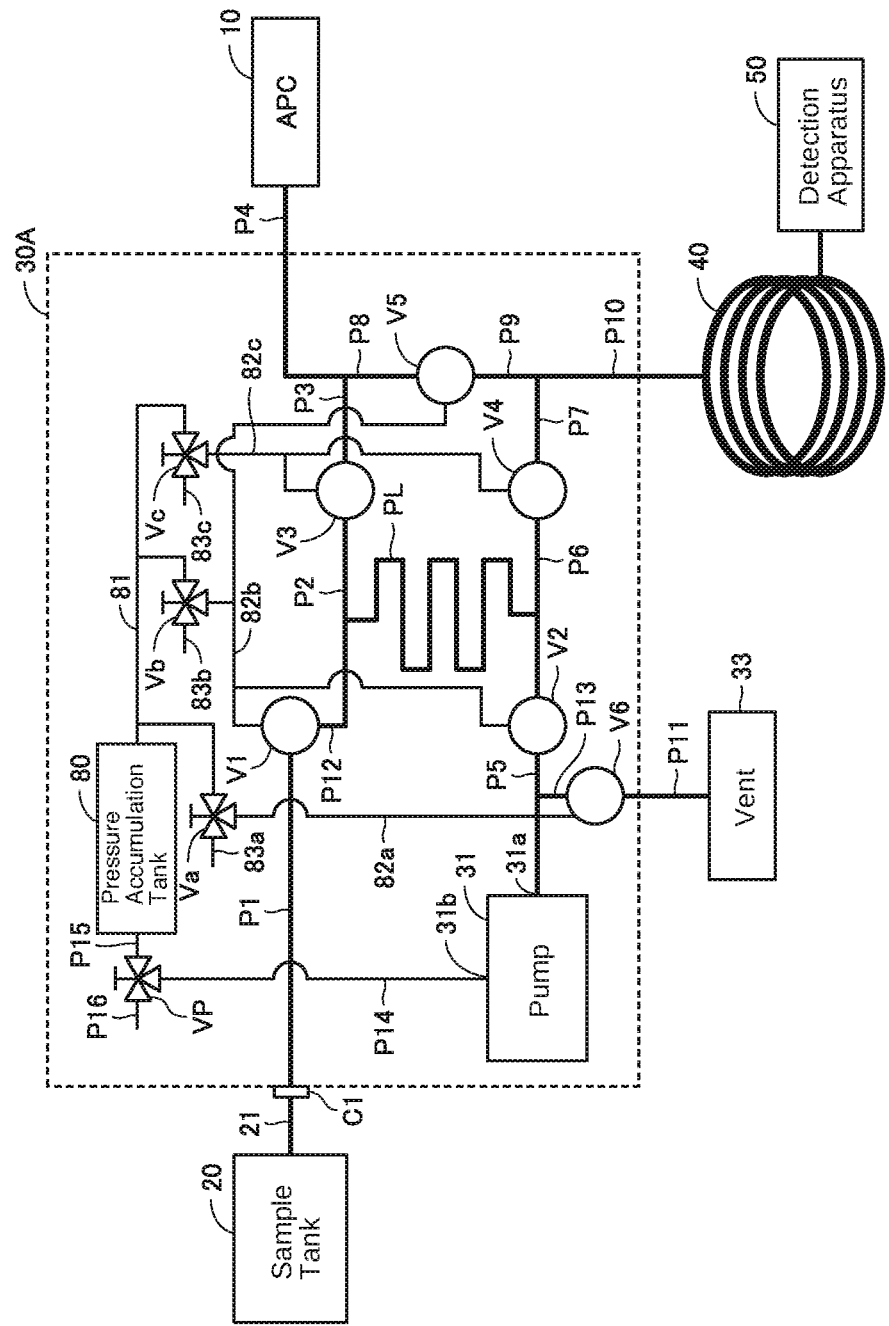
FIG. 8 is a diagram schematically showing an example of a configuration of a gas sampler.

FIG. 8 is a diagram schematically showing an example of a configuration of a gas sampler 30A according to the second modification. In the gas sampler 30A, the connection destination of the piping P13 of the gas sampler 30 shown in FIG. 1 described above is changed from the piping P2 to the piping P5. That is, in the gas sampler 30A, the vent 33 is connected to the piping P5 between the pump 31 and the switching valve V1 via the switching valve V6. Note that the terms "switching valve V1" and "switching valve V6" in this second modification correspond to "first switching valve" and "second switching valve" in this disclosures.

In the gas sampler 30A according to this second modification, the switching valve V6 can be in the open state to communicate between the pump 31 and the vent 33 while making the switching valve V2 in the closed state to cut off between the pump 31 and the sample loop PL. Therefore, the pressure accumulation processing can be executed during the sample supply processing.

Figure 9:
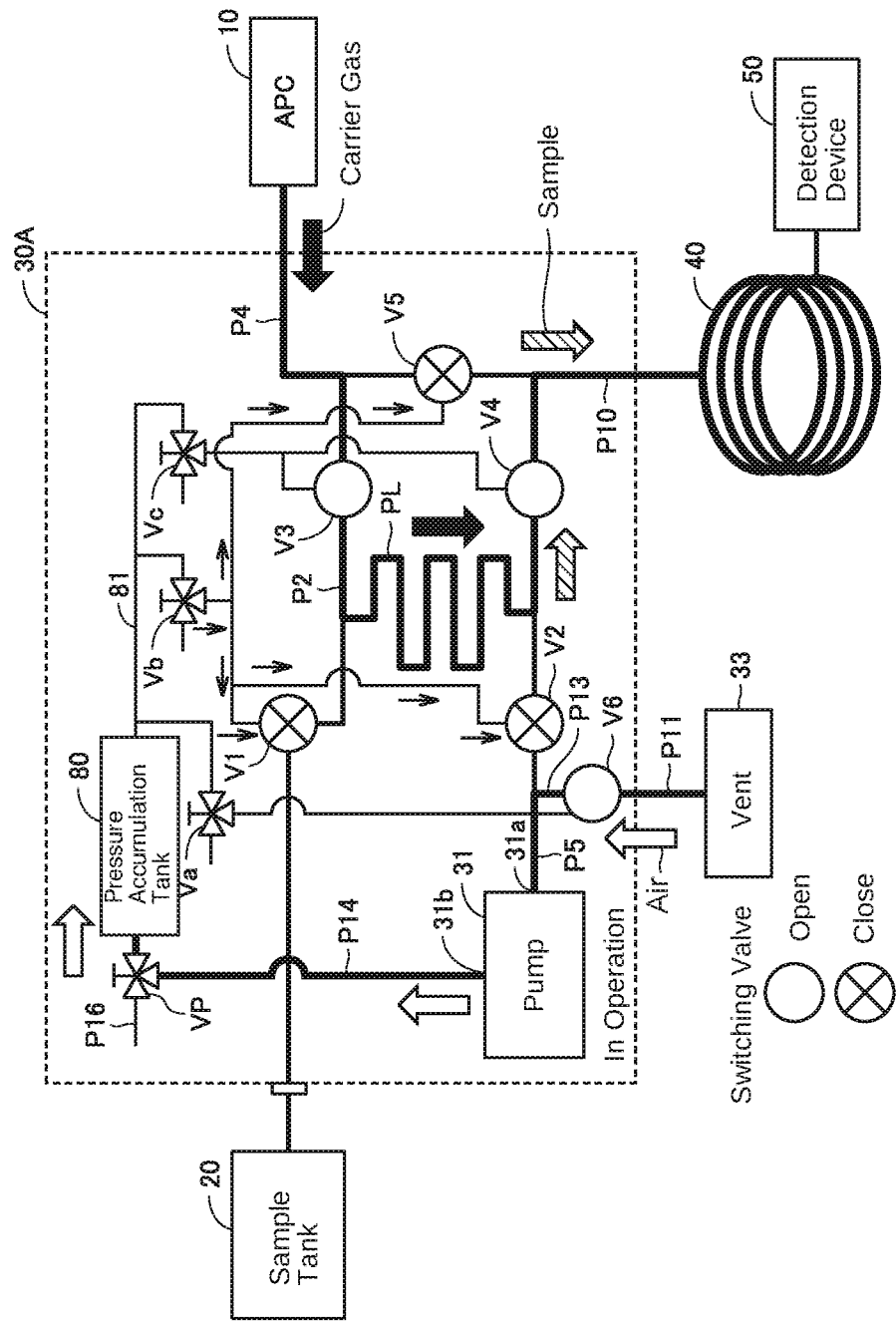
FIG. 9 is a diagram showing a state of a gas sampler when pressure accumulation processing is executed during sample supply processing.

FIG. 9 is a diagram showing the state of the gas sampler 30A when the pressure accumulation processing is executed during the sample supply processing. In this case, the switching valves V1, V2, and V5 are made in the closed state, the switching valves V3, V4, and V6 are made in the open state, the pressure accumulation valve VP is made in the supply state, and the pump 31 is operated. Thus, as shown in the black solid arrows, the carrier gas from the APC 10 is supplied to the sample loop PL via the switching valve V3, and the sample gas filled in the sample loop PL is supplied to the column 40 via the switching valve V4. As a result, the above-described sample supply processing is executed. Further, as indicated by the white hollow arrows, air is suctioned from the vent 33 via the switching valve V6 to the pump 31, and the discharge pressure of the pump 31 is supplied to the pressure accumulation tank 80 via the pressure accumulation valve VP. As a result, the above-described pressure accumulation processing is executed during the sample supply processing. Therefore, in this second modification, the discharge pressure of the pump 31 supplied to the pressure accumulation tank 80 and the control piping 81 is used as the driving pressure of the switching valves V1, V2, and V5 in real time.

As described above, in the gas sampler 30A according to the second modification, the pump 31 can be configured to be communicable to the vent 33 without by way of the sample loop PL. Therefore, the pressure accumulation processing can be executed during the sample supply processing.

(Third Modification)

In the above-described embodiments, the discharge pressure of the pump 31 (positive pressure) is accumulated in the pressure accumulation tank 80 in the pressure accumulation processing. However, the pressure to be accumulated in the pressure accumulation tank 80 in the pressure accumulation processing may be the pressure generated by the operation of the pump 31, and is not necessarily limited to the discharge pressure (positive pressure) of the pump 31.

For example, in the pressure accumulation processing, the inside of the pressure accumulation tank 80 may be made to be a negative pressure by the operation of the pump 31, and the negative pressure may be accumulated in the pressure accumulation tank 80 as a source pressure of a driving pressure. In this case, the switching valves V1 to V6 may be changed to be driven by a negative pressure accumulated in the pressure accumulation tank 80.

[Aspects]

It will be understood by those skilled in the art that the above-described embodiments and the modifications thereof are illustrative of the following aspects.

(Item 1)

A gas sampler according to one aspect of the present disclosure is for supplying a sample gas to a column of a gas analyzer. The gas sampler includes: a connection portion connectable to a sample tank filled with the sample gas; a sample holding portion configured to hold the sample gas to be introduced into the connection portion from the sample tank; a pneumatic switching valve configured to switch a flow path connected to the sample holding portion; a control piping configured to transmit a driving pressure to the switching valve; a pump configured to suction an inside of the sample holding portion; and a tank configured to accumulate pressure generated by an operation of the pump as a source pressure of the driving pressure.

According to the gas sampler as recited in the above-described Item 1, there is provided a tank for accumulating the pressure generated by the operation of the pump for suctioning the inside of the sample holding portion as a source pressure of a driving pressure. Therefore, by operating the pump, the source pressure of the driving pressure can be accumulated in the tank. As a result, the driving pressure of the switching valve can be generated without providing a dedicated pressure controller for generating a source pressure of a driving pressure, thereby suppressing the gas analyzer from becoming large and complicated.

(Item 2)

In the gas sampler as recited in the above-described Item 1, the switching valve switches a flow path for introducing the sample gas to the sample holding portion, a flow path for introducing a carrier gas to the sample holding portion, and a flow path for supplying the sample gas in the sample holding portion to a column.

(Item 3)

In the gas sampler as recited in the above-described Item 1 or 2, the tank is connected between a discharge port of the pump and the control piping and is configured to accumulate a discharge pressure of the pump as the source pressure of the driving pressure.

According to the gas sampler described recited in the above-described Item 3, the discharge pressure of the pump generated at the time of suctioning the inside of the sample holding portion by the pump can be effectively used as a source pressure of a driving pressure.

(Item 4)

In the gas sampler as recited in any one of the above-described Items 1 to 3, the gas sampler further includes a vent communicated with an outside. The switching valve includes a vent valve configured to switch a connection state between a suction port of the pump and the vent. The vent valve is configured to be made in an open state when the driving pressure is not supplied and be made in a closed state when the driving pressure is supplied.

According to the gas sampler as recited in the above-described Item 4, in the initial state in which no driving pressure is supplied to the vent valve, the vent valve is made in the open state, and the pump suction port and the outside are communicated with each other. Therefore, the outside air suctioned from the vent by the pump can be accumulated in the tank instead of the sample gas and the carrier gas. This prevents the sample gas from being supplied to the tank, which in turn can prevent the tank from being corroded by the sample gas.

(Item 5)

In the gas sampler as recited in the above-described Item 4, the gas sampler further includes a control device configured to control the pump and the switching valve. The control device executes: pressure accumulation processing of accumulating a discharge pressure of the pump in the tank by activating the pump when the vent valve is in the open state; introduction processing of introducing the sample gas to the sample holding portion by activating the pump in a state in which the vent valve is in the closed state, after executing the pressure accumulation processing; and supply processing of supplying the sample gas in the sample holding portion to the column after executing the introduction processing.

According to the gas sampler as recited in the above-described Item 5, the pressure accumulation processing is executed before executing the introduction processing and the execution of supply processing. Thus, the pressure accumulated in the tank by the pressure accumulation processing can be used to control the switching valve in the introduction processing and the supply processing.

(Item 6)

In the gas sampler as recited in the above-described Item 5, the gas sampler further includes an electro-magnetic pressure accumulation valve arranged between a discharge port of the tank and the pump. The control device controls the pressure accumulation valve so that the discharge port of the pump is communicated with the tank during the pressure accumulation processing, and controls the pressure accumulation valve so that the discharge port of the pump is communicated with an outside of the gas sampler during the introduction processing.

According to the gas sampler as recited in the above-described Item 6, since the discharge port of the pump is communicated with the tank during the pressure accumulation processing, the discharge pressure of the pump can be accumulated in the tank. Further, since the discharge port of the pump is communicated with the outside of the gas sampler during the introduction processing, it is possible to suppress the sample gas from being supplied from the pump to the tank during the introduction processing. Therefore, it is possible to suppress the tank from being corroded by the sample gas.

(Item 7)

According to the gas sampler for supplying a sample gas to a column of a gas analyzer, the gas sampler includes: a connection portion connectable to a sample tank filled with the sample gas; a sample holding portion configured to hold the sample gas introduced to the connection portion from the sample tank; a pneumatic switching valve configured to switch a flow path connected to the sample holding portion; a control piping configured to transmit a driving pressure to the switching valve; a pump configured to suction an inside of the sample holding portion; and a supply piping arranged between the pump and the control piping to supply a pressure generated by an operation of the pump to the control piping as a source pressure of the driving pressure.

According to the gas sampler as recited in the above-described item 7, there is provided a supply piping for supplying a pressure generated by the operation of the pump for suctioning the inside of the sample holding portion to the control pipings as a source pressure of a driving pressure. Therefore, the source pressure of the driving pressure of the switching valve can be supplied to the control pipings by the operating pump. As a result, a dedicated pressure controller for generating a source pressure of a driving pressure is not required, which suppresses an increase in size of a gas analyzer.

(Item 8)

The gas sampler as recited in the above-described Item 7, the gas sampler further includes a vent communicated with an outside of the gas sampler. The switching valve includes: a first switching valve connected between the pump and the sample holding portion; and a second switching valve provided between a flow path connecting the pump and the first switching valve and the vent and configured to be made in an open state when the driving pressure is not supplied and be made in a closed state when the driving pressure is supplied.

According to the gas sampler described in the above-described Item 8, the pump and the vent can be communicated with each other while cutting off between the pump and the sample holding portion by making the second switching valve in the open state while making the first switching valve in the closed state. Thus, during which the sample gas is being supplied from the sample holding portion to the column, the pump can be operated to provide the discharge pressure of the pump to the switching valves as a driving pressure of a switching valve.

Although some embodiments of the present invention have been described, the embodiments disclosed herein are to be considered in all respects as illustrative and not restrictive. The scope of the present invention is indicated by claims, and it is intended to include all modifications within the meanings and ranges equivalent to those of the claims.

The invention claimed is:

1. A gas sampler for supplying a sample gas to a column of a gas analyzer, comprising:
   a connection portion connectable to a sample tank filled with the sample gas;
   a sample holding portion arranged to accommodate the sample gas to be introduced into the connection portion from the sample tank;
   a plurality of pneumatic switching valves configured to configure different flow paths within the gas sampler respectively corresponding to different switching configurations of the pneumatic switching valves, at least some of the flow paths being connected to the sample holding portion;
   control piping fluidly connected to the pneumatic switching valves, and configured to transmit driving pressure to the pneumatic switching valves to control a connection state of each pneumatic switching valve;
   a pump fluidly connected to the sample holding portion, and configured to apply suction inside the sample holding portion; and
   a tank fluidly connected to the control piping and the pump, and configured to accumulate pressure generated by an operation of the pump for a source pressure from which the driving pressure is derived.

2. The gas sampler as recited in claim 1,
   wherein the pneumatic switching valves are configured to configure a flow path for introducing the sample gas to the sample holding portion, a flow path for introducing a carrier gas to the sample holding portion, and a flow path for supplying the sample gas in the sample holding portion to a column.

3. The gas sampler as recited in claim 1,
   wherein the tank is connected between a discharge port of the pump and the control piping and is configured to accumulate a discharge pressure of the pump as the source pressure of the driving pressure.

4. The gas sampler as recited in claim 1, further comprising:
   a vent in communication with an outside,
   wherein the pneumatic switching valves includes a vent valve configured to switch a connection state between a suction port of the pump and the vent, and
   wherein the vent valve is configured to have an open state when the driving pressure is not supplied and have a closed state when the driving pressure is supplied.

5. The gas sampler as recited in claim 4, further comprising:
   a control device configured to control the pump and the pneumatic switching valves,
   wherein the control device is configured to execute:
   pressure accumulation processing to accumulate a discharge pressure of the pump in the tank by operating the pump when the vent valve is in the open state;
   introduction processing to introduce the sample gas to the sample holding portion by operating the pump in a state in which the vent valve is in the closed state, after executing the pressure accumulation processing; and
   supply processing to supply the sample gas in the sample holding portion to the column after executing the introduction processing.

6. The gas sampler as recited in claim 5, further comprising:
   an electro-magnetic pressure accumulation valve arranged between a discharge port of the tank and the pump,
   wherein the control device is configured to control the pressure accumulation valve so that the discharge port of the pump is in communication with the tank during the pressure accumulation processing, and controls the pressure accumulation valve so that the discharge port of the pump is in communication with an outside of the gas sampler during the introduction processing.

7. A gas sampler for supplying a sample gas to a column of a gas analyzer, comprising:
   a connection portion connectable to a sample tank filled with the sample gas;
   a sample holding portion arranged to accommodate the sample gas to be introduced into the connection portion from the sample tank;
   a plurality of pneumatic switching valves configured to configure different flow paths within the gas sampler respectively corresponding to different switching configurations of the pneumatic switching valves, at least some of the flow paths being connected to the sample holding portion;
   control piping fluidly connected to the pneumatic switching valves, and configured to transmit driving pressure to the pneumatic switching valves to control a connection state of each pneumatic switching valve;
   a pump fluidly connected to the sample holding portion, and configured to apply suction inside the sample holding portion; and
   supply piping fluidly connected to the control piping and the pump, and arranged between the pump and the control piping to supply a pressure generated by an operation of the pump to the control piping as a source pressure of the driving pressure.

8. The gas sampler as recited in claim 7, further comprising:
- a vent in communication with an outside of the gas sampler,
- wherein the pneumatic switching valves include:
- a first switching valve connected between the pump and the sample holding portion; and
- a second switching valve provided between a first flow path connecting the pump and the first switching valve and the vent and configured to be made in an open state when the driving pressure is not supplied and be made in a closed state when the driving pressure is supplied.

\* \* \* \* \*